US012070832B2

(12) United States Patent
Maag et al.

(10) Patent No.: US 12,070,832 B2
(45) Date of Patent: Aug. 27, 2024

(54) METHOD AND DEVICE FOR FINE MACHINING CYLINDRICAL WORKPIECE SURFACES

(71) Applicant: Microcut Ltd, Lengnau (CH)

(72) Inventors: Urs Maag, Lommiswil (CH); Thomas Kohler, Biberist (CH); Melchiorre Palumbo, Genchen (CH)

(73) Assignee: Microcut Ltd (CH)

( * ) Notice: Subject to any disclaimer, the term of this patent is extended or adjusted under 35 U.S.C. 154(b) by 1085 days.

(21) Appl. No.: 16/647,012

(22) PCT Filed: Jul. 23, 2018

(86) PCT No.: PCT/EP2018/069908
§ 371 (c)(1),
(2) Date: Mar. 12, 2020

(87) PCT Pub. No.: WO2019/052724
PCT Pub. Date: Mar. 21, 2019

(65) Prior Publication Data
US 2020/0206864 A1    Jul. 2, 2020

(30) Foreign Application Priority Data
Sep. 14, 2017   (DE) .................... 10 2017 121 269.8

(51) Int. Cl.
*B24B 33/02*     (2006.01)
*B24B 1/04*      (2006.01)
(Continued)

(52) U.S. Cl.
CPC .............. *B24B 33/02* (2013.01); *B24B 33/08* (2013.01); *B24B 1/04* (2013.01); *B24B 33/06* (2013.01); *B24B 33/105* (2013.01); *B24B 49/16* (2013.01)

(58) Field of Classification Search
CPC ......... B24B 33/02; B24B 33/06; B24B 33/08; B24B 33/087; B24B 33/105;
(Continued)

(56) References Cited

U.S. PATENT DOCUMENTS 3,451,175 A    6/1969  Sunnen et al.
3,653,855 A    4/1972  Smith
(Continued)

FOREIGN PATENT DOCUMENTS

DE            39 19 895      12/1990
DE    10 2006 011 304         9/2007
(Continued)

OTHER PUBLICATIONS

Office Action for European Patent Application No. 18 743 803.1-1103, dated Apr. 26, 2023, 14 pages (including English translation).
(Continued)

*Primary Examiner* — Abbie E Quann
(74) *Attorney, Agent, or Firm* — Haynes and Boone, LLP

(57) ABSTRACT

The invention relates to a method for fine machining a cylindrical workpiece surface of a workpiece blank by means of a fine machining tool. Said method comprising the following steps: generating a relative rotational movement between a tool and a workpiece blank about a machining axis which is concentric to a cylindrical workpiece surface of the workpiece blank; generating a relative feed rate between the tool and the workpiece blank along the machining axis; detecting an actual value of a process variable, which is a function of a relative force between the tool and the workpiece blank and which can assume a plurality of process variable values; and continuously controlling the process variable by changing the relative feed rate in such a way that the more the relative feed rate changes, the more
(Continued)

the actual value of the process variable deviates from a desired value of the process variable.

12 Claims, 6 Drawing Sheets

(51) Int. Cl.
*B24B 33/06* (2006.01)
*B24B 33/08* (2006.01)
*B24B 33/10* (2006.01)
*B24B 49/16* (2006.01)

(58) Field of Classification Search
CPC ....... B24B 33/022; B24B 33/025; B24B 1/04; B24B 49/16; B24B 47/20; B24B 49/006; B24B 49/10; B24B 33/027
USPC .................................................. 451/5, 11, 27
See application file for complete search history.

(56) References Cited

U.S. PATENT DOCUMENTS

| | | | |
|---|---|---|---|
| 4,524,543 A * | 6/1985 | Inoue | B24B 1/04 451/155 |
| 6,793,560 B2 | 9/2004 | Weigmann et al. | |
| 7,371,149 B2 | 5/2008 | Cloutier et al. | |
| 7,575,502 B2 | 8/2009 | Cloutier et al. | |
| 2007/0298685 A1* | 12/2007 | Cloutier | B24B 49/16 451/5 |
| 2008/0220696 A1 | 9/2008 | Clouter et al. | |
| 2010/0002179 A1 | 1/2010 | Horiguchi | |
| 2013/0025124 A1 | 1/2013 | Nagel et al. | |
| 2017/0282330 A1 | 10/2017 | Harte et al. | |

FOREIGN PATENT DOCUMENTS

| | | |
|---|---|---|
| DE | 10 2011 000 348 | 7/2012 |
| DE | 10 2012 216 360 | 3/2014 |
| DE | 10 2014 018 541 | 3/2014 |
| DE | 10 2015 203 051 | 8/2016 |
| EP | 0496303 | 7/1992 |
| EP | 1 815 944 | 8/2007 |
| JP | 3148034 | 3/2001 |
| WO | WO 92/07687 | 5/1992 |
| WO | WO 97/26113 | 7/1997 |
| WO | WO 01/45902 | 6/2001 |
| WO | WO 01/92815 | 12/2001 |
| WO | WO 2006/029180 | 3/2006 |
| WO | WO 2016/037143 | 3/2016 |

OTHER PUBLICATIONS

Office Action for Chinese PatentApplication No. 201880059607.3, dated Apr. 30, 2021, 18 pages (including English translation).

* cited by examiner

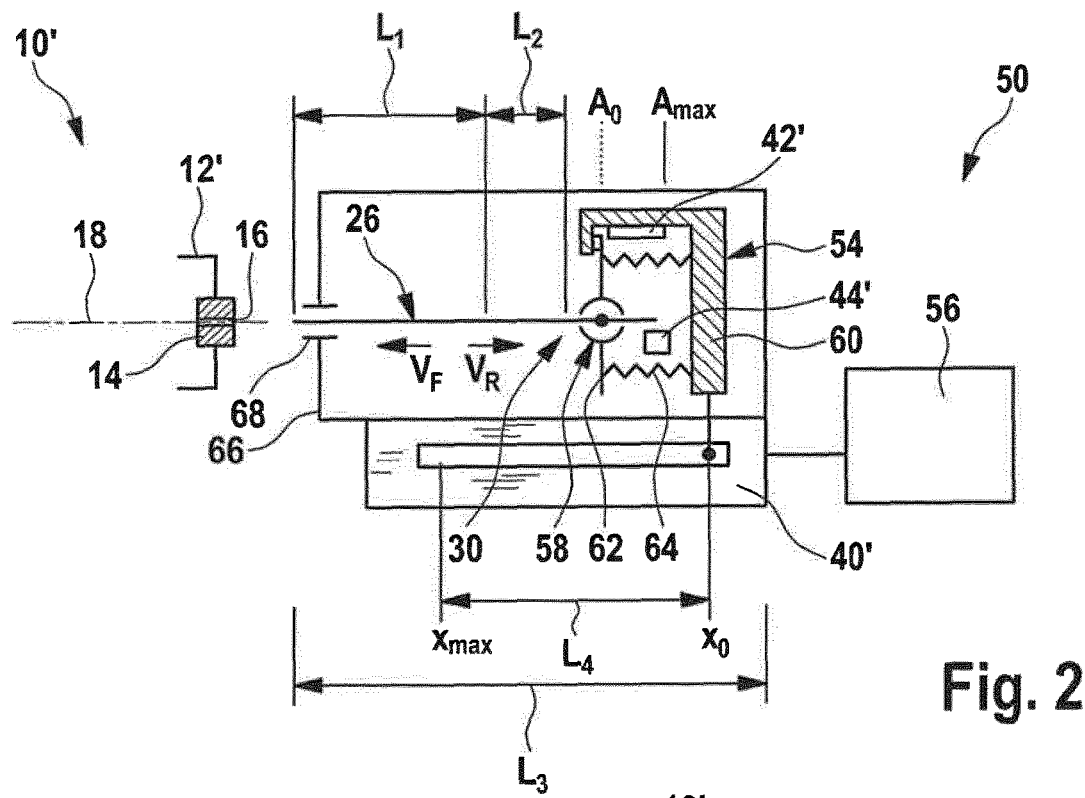
Fig. 2
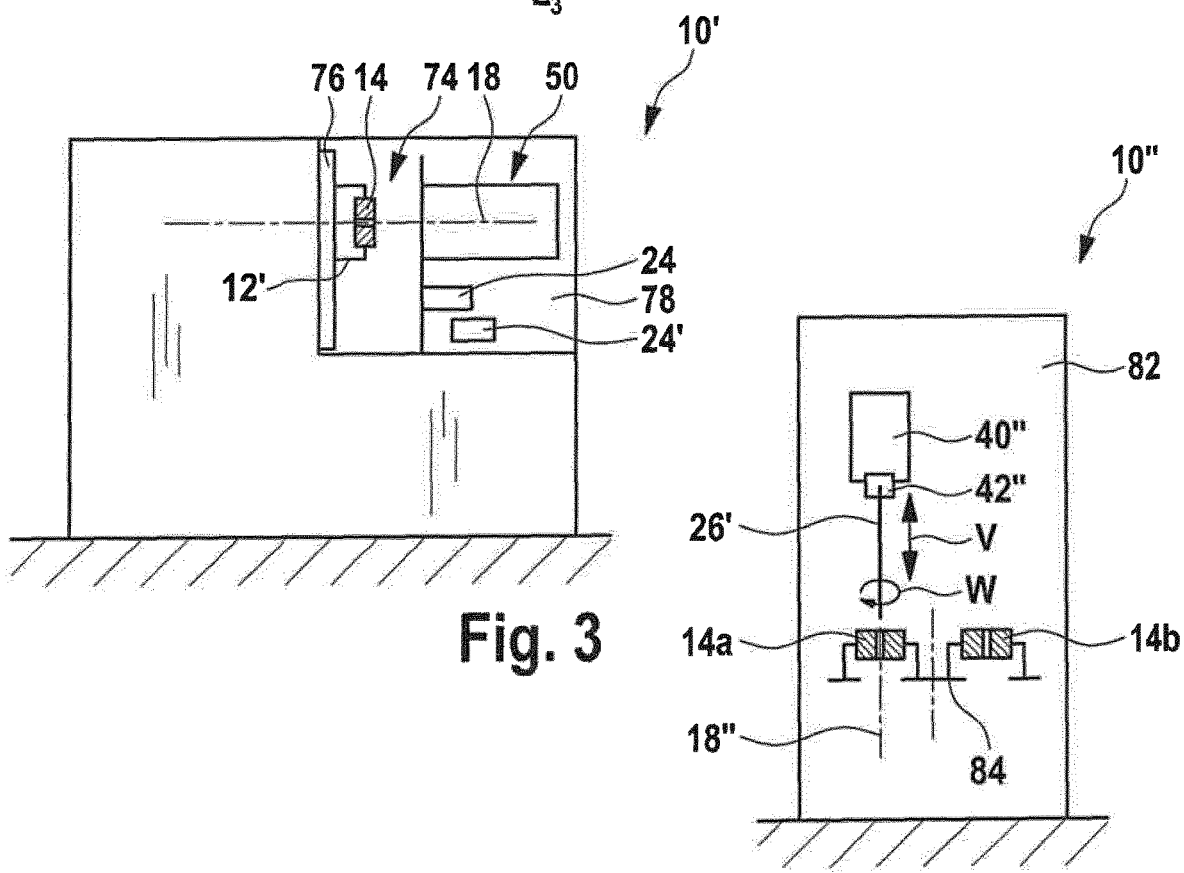
Fig. 3
Fig. 4

METHOD AND DEVICE FOR FINE MACHINING CYLINDRICAL WORKPIECE SURFACES

CROSS-REFERENCE TO RELATED APPLICATIONS

This patent application is a U.S. National Stage Patent Application under 35 U.S.C. 371 of International Patent Application No. PCT/EP2018/069908 filed Jul. 23, 2018, which claims priority to and the benefit of German Patent Application No. 10 2017 121 269.8 filed Sep. 14, 2017, all of which are hereby incorporated by reference in their entirety.

TECHNICAL FIELD

The present invention relates to a method for fine machining a cylindrical workpiece face of a workpiece blank by means of a fine machining tool. The present invention furthermore relates to a device for machining cylindrical workpiece faces, having a clamping installation for a workpiece, having a tool for machining a cylindrical workpiece face of the workpiece, having a rotary drive for establishing relative rotation between the workpiece and the tool, as well as having an axial drive for establishing a relative feed rate between the workpiece and the tool.

The present invention relates in general to the field of fine machining cylindrical workpiece faces. Such fine machining herein is in particular to be understood as machining procedures in which a cylindrical workpiece face has already been produced on a workpiece blank by means of a cutting tool such as a turning tool, a drill bit or the like, and in which said cylindrical workpiece face produced in a subtractive manner (in particular by way of a cutting edge with a defined geometry) is still to be improved in terms of the quality thereof. This can be in particular an improvement of the surface characteristic, but can also be an improvement of the accuracy in terms of shape, in terms of dimensions, or other quality features of a cylindrical workpiece face. The cylindrical workpiece faces to be fine machined can also be produced by laser machining, by spark erosion, or by molding a core, by casting, by 3D printing, etc.

BACKGROUND

Typical shape defects are out-of-roundness, oversized tapers, undulations, conicities, or banana shapes. Furthermore, workpieces having a dimensional accuracy of a few micro-meters are often required.

So-called honing is a typical fine machining or precision-machining technique, respectively. Honing belongs to the subtractive manufacturing methods having a geometrically undefined cutting-edge. Other methods of this type are grinding, lapping, polishing.

In honing, a rotary movement, a feed movement, and a radial stroke movement are often combined with one another. For this purpose, a honing tool often has one or a plurality of honing stones which by way of a spring construction can be pushed radially outward, for example.

A method for machining by honing is known from document EP 1 236 539 A2, wherein post-machining is carried out using a mandrel honing tool conjointly with or subsequent to mandrel honing using the same tool, in which the ratio of the stroke rate to the rotating speed of the tool is significantly increased. On account thereof, an improved cruciform structure of the honing marks is to be achieved, this in turn enabling a better oil retention capability.

Document US 2010/0029179 A1 discloses a honing system for a workpiece bore, having a honing tool which is mounted on a rotating spindle, wherein the honing tool has at least one honing stone which is movable in a radial manner. An actuator system contains a movable actuator element which is automatically controllable for exerting an actuating force on the honing tool, specifically so as to push the at least one honing stone radially outward. The entire tool can be advanced axially along a machining axis. A honing method carried out therewith includes that the actuator element is activated for radially pressing the honing stone within the bore of the workpiece while the honing tool rotates. The actuation rate is reduced as soon as initial contact has been established.

Document WO 2006/029180 A1 likewise relates to a method in which a honing stone can be activated in various ways, specifically by way of two different levels in terms of actuating force.

Document WO 97/26113 furthermore discloses a method and a machine for machining bores, specifically in particular minute bores in ceramic blanks, for example. A wire is used as the honing tool, wherein an oscillating translatory movement is established between a blank and the wire. In particular, the wire is introduced into the blank bore by machine so as to lie freely in said blank bore, and is pushed or fed, respectively, relative to the blank in a manner corresponding to the machining progress. The translatory movement can be carried out at a frequency in the range from 0.1 Hz right up to the kHz range. Tensile forces and/or compressive forces can be measured and be used for controlling the oscillating operating movement, or the relative feed in relation to the blank, respectively. The wire is supplied so as to automatically run out of a magazine and is provided with an abrasive before said wire plunges into the blank bore so as to lie freely in the latter.

Document WO 01/92815 A1 discloses an automatic device for testing a bore in a small workpiece. A sensor herein can detect the deflection of the workpiece at a specific testing needle pressure.

Document WO 01/45902 A1 discloses a device and a method for the concentric circular grinding of a workpiece.

Document DE 10 2012 216 360 A1 also discloses a honing system, in particular for honing on a machining center, having a tool head which is capable of being releasably fixed to a rotatingly drivable machine spindle of a machine tool, and having a honing tool which is capable of being coupled to the tool head. The honing tool has honing stones which by way of an adjustment mechanism on the tool are adjustable transversely to the rotation axis. The tool head includes a drive installation which for actuating the adjustment mechanism is provided with an actuator motor.

Finally, from "Präzise und wirtschaftlich auch kleine Bohrungen fertigen" ("Producing even small bores in a precise and economical manner"), CH-Präzisionsfertigungstechnik 2017, Jul. 30, 2017, Microcut Switzerland, and "Hochgenau in Maß und Form" ("Highly accurate in terms of dimension and shape"), Schweizer Präzisionsfertigungstechnik, July 2017, it is known for a one-piece tool (with an undefined cutting edge) which is covered with one tier of diamond or CBN and which has a conical and a cylindrical portion, to be driven in a force-controlled manner through a bore to be machined by way of rotary and translatory movements in multiple strokes. This honing technique represents a refinement of mandrel honing (single-stroke honing). This technique is in particular economical for optimizing the function of small and interrupted through bores, in particular also for hard materials which are difficult to cut. The shape, surface, and diameter of a bore can be manufactured in tightest tolerance ranges in a reliable process.

SUMMARY

Against this background, it is an object of the invention to specify an improved fine machining method, an improved fine machining device, as well as an improved fine machining tool.

The object above is achieved by a method for fine machining a cylindrical workpiece face of a workpiece blank by means of a fine machining tool, said method comprising the following steps: generating a relative rotation between a tool and a workpiece blank about a machining axis which is concentric with a cylindrical workpiece face of the workpiece blank; generating a relative feed rate between the tool and the workpiece blank along the machining axis; detecting an actual value of a process variable which is a function of a relative force between the tool and the workpiece blank and which can assume a multiplicity of process variable values; and continuously controlling the process variable by changing the relative feed rate in such a manner that the more the actual value of the process variable deviates from a nominal value of the process variable, the more the relative feed rate changes.

The object is furthermore achieved by a device for machining cylindrical workpiece faces, having a clamping installation for a workpiece; having a tool for machining a cylindrical workpiece face of the workpiece; having a rotary drive for establishing the relative rotation between the workpiece and the tool; having an axial drive for establishing a relative feed rate between the workpiece and the tool; and having a control device which is specified for carrying out the method according to the invention.

In the fine machining or precision machining method, respectively, according to the invention, the tool used can be a conventional honing tool having radially readjustable honing stones. The tool can in particular be a mandrel honing tool which possesses a cylindrical stationary or bush-type honing portion having a surface structure which is often helical. When using a mandrel honing tool of this type, a controlled feed rate and/or superimposing an oscillation onto a non-controlled or a controlled feed rate can also be advantageous. However, it is preferable for the fine machining tool to be a one-part or integral, respectively, tool which is configured so as to be substantially mandrel-shaped, having a conical portion and a shank portion.

The above object is finally achieved by a fine machining tool for carrying out the method according to the invention, having a conical portion which extends across a first axial length, and having a shank portion which has a consistent tool diameter and which extends across a second axial length, wherein the ratio of first axial length to second axial length is in a range from 1:2 to 10:1.

The cylindrical workpiece face of the workpiece blank, or the workpiece, respectively, can be a cylindrical external face but is preferably a bore. The workpiece face has preferably been generated by means of a cutting tool which has a geometrically determined cutting-edge, thus for example a drill bit, a turning tool, or the like. The workpiece face can however also be produced by other types of machining, for example by laser machining, by spark erosion, or by molding a core (for example by CIM [ceramic injection molding] or isostatic pressing with subsequent debinding and a sintering process), by casting, by 3D printing, etc.

The fine machining tool is typically coated with a grinding material, thus for example with diamond, CBN, or the like.

The method herein is preferably carried out such that a conical portion of the tool is the first to come into contact with the cylindrical workpiece face. The cylindrical material face here in has preferably been produced by the cutting tool such that a slight undersize in relation to a nominal dimension has been specified, said undersize to be rendered to the nominal dimension by means of the fine machining process. High-quality fine machining can be achieved by initially bringing the conical face of the conical portion to bear on a circumferential edge (annular edge) of the cylindrical workpiece face and on account of the relative feed rate established.

In the prior art, a reverse stroke to the feed rate is immediately initiated when a specific relative force between the tool and the workpiece has been reached, so as to prevent any "seizing" of the tool on the workpiece. The overall process has therefore been relatively time-consuming.

A significant increase in the machining rate can be achieved on account of the measure of continuously controlling the process variable by changing the relative feed rate in such a manner that the more an actual value of the process variable deviates from a nominal value of the process variable, the more the relative feed rate changes. This is because a machining procedure can in many cases be carried out in one stroke, thus by way of a forward movement and optionally a variable rate, without a reverse stroke having to be initiated.

This process herein can lead to the previously usual machining rate being halved.

Furthermore, significantly fewer stress peaks also result in particular for the tool. Whenever the continuous controller notices that the process variable increases, the relative feed rate is decreased somewhat, for example, so as to in this way avoid, for example, that a threshold value at which a reverse stroke is to be inevitably initiated is reached. This is because a threshold value of this type may still be established as before also in the present method. However, said threshold value by virtue of the continuous controlling is reached significantly less often such that no reverse strokes, or at least fewer reverse strokes, take place.

A cross-ground finish can also be achieved on the cylindrical workpiece surface by means of the fine machining tool, in particular in the case of an additional oscillation (rapid stroke) or by way of "sparking out". Moreover, a plurality of changes of direction can in particular have a positive effect on forming burrs on transverse bores.

The fine machining method in one preferred variant therefore includes at least one reverse stroke which optionally is to be actively initiated by a control installation in particular when this is advantageous for overriding reasons, without having reached a specific threshold value of the process variable.

Furthermore, with the present method there is no tendency toward blocking of the tool by virtue of a "screwdriver effect", in particular with an additional rapid stroke.

The tool preferably has an axial length which in terms of size is a multiple of the corresponding axial length of the cylindrical workpiece face to be machined. The ratio of axial overall length of the tool to the axial length of the cylindrical workpiece face is preferably in a range from 500:1 to 2:1, in particular in a range from 300:1 to 10:1.

The ratio of first axial length to second axial length (of the conical portion and shank portion, respectively) is preferably in a range from 1:0.1 to 1:2 (=1:2 to 10:1) in such a manner that the conical portion can be ten times the length of the shank portion, but can also be only half the length of the shank portion. The ratio is preferably in a range from 1:0.3 to 1:0.8.

As mentioned, the cylindrical workpiece face is preferably a face of a bore, but can also be an external circumferential face of a cylindrical portion.

The relative rotation between the tool and the workpiece blank can preferably be established at rotating speeds of up to 10,000 revolutions per minute. The generation of the relative rotation preferably takes place by rotating the workpiece blank about the machining axis, for example by means of a machine tool, in particular when the method is carried out on a honing module. However, in the case of a honing machine, the tool per se can also be set in rotation relative to a stationary workpiece blank.

The relative feed rate between the tool and the workpiece blank is preferably established by moving the tool, but can also be established by moving the workpiece blank, or by a combination of both. The direction along the machining axis is preferably parallel to the latter.

The process variable which is a function of a relative force between the tool and the workpiece blank can be an axial force, for example, but can in particular be a torque therebetween. Alternatively thereto, it is possible that the process variable is an electric motor current of an electric motor which generates the relative feed rate, and/or of a motor which generates the relative rotation. In general, in terms of the process variable it is also possible for a pressure to be resorted to, for example when a pneumatic cylinder/piston solution is used for damping relative movements between the tool and the workpiece, and/or for moving the tool in the feed direction.

The process variable herein can assume a multiplicity of process variable values, a single threshold value thus not being resorted to alone. A multiplicity of process variable values is to be understood as a number of 3 or 4, or significantly more, different process variable values.

The process variable can be measured at the tool or at the workpiece. At least one sensor can be provided for determining the process variable. The sensor can be a conventional analog sensor, for example a path sensor or a force sensor. A path sensor can in particular be provided in conjunction with a component which is movable in the direction of measurement and a spring and/or damper installation (or an element which can represent a force/path characteristic line). It is however understood that a signal of an "analog" sensor of this type for processing in a control device is typically converted to the digital domain. Alternatively, it is also possible for sensors which provide digital data from the outset but in any case can detect a multiplicity of different process variable values to be used.

Continuous controlling herein is therefore in particular understood to be a controlling procedure which does not display a classic two-point or three-point characteristic. Rather, continuous controlling can process a multiplicity of different process variable values, and/or can generate a multiplicity of different correcting variables.

The continuous controller can in particular be a proportional controller (P controller). Here, a correcting variable, or a controller output variable, respectively, (for example an actuating value for the relative feed rate) is typically proportional to a controlling differential (thus preferably a difference between an actual value of the process variable and a nominal value of the process variable).

In the case of a proportional controller, a rapid response to variations in the actual variable is indeed generally possible. However, in the case of a proportional controller, there typically remains a certain controlling deviation between the nominal value and the actual value. This is however not highly disadvantageous here, since the objective is not to establish a specific value in terms of the process variable or of the relative feed rate, but flexibly and rapidly respond to changes in the process and to changes in terms of disturbance variables.

However, such a proportional controller can optionally also be combined with an integral controller and/or with a differential controller (for example so as to form a so-called PI controller or a PD controller or a PID controller).

In general, a maximum feed rate can be set which then is reduced according to requirements when a machining torque increases.

In other cases it is conceivable for the continuous controlling to be established such that the feed rate is increased, for example when the actual value of the process variable drops below a nominal value of the process variable. Preferably, the rate is generally increased in the event of a decrease in the measured process variable.

According to the invention it is thus preferably provided that the relative feed rate, or the relative feed between the tool and the workpiece, respectively, is continuously controlled, in particular so as to be proportional to the process variable, the latter potentially being in particular a relative torque between the tool and the workpiece.

In many cases, the actual fine machining process can take place continually over a comparatively long time and without any reverse stroke on the workpiece. For overriding reasons, for example in order for chips to be removed, it can however also be expedient for a reverse stroke to be occasionally carried out during the fine machining process.

Parameters of the fine machining process can be adapted depending on various ambient parameters. For example, such an ambient parameter can be whether the fine machining tool is new or has already been in use for some time. It can be avoided on account thereof that a new tool, which at the outset is very "aggressive", "eats its way into" the workpiece too rapidly.

The controller is preferably a proportional controller which resorts to deviations of the actual process variable from a nominal process variable. Optionally, a differential of said difference can also be resorted to.

The nominal value of the process variable can be a constant value, but can also be a value which varies throughout the process sequence.

The object is fully achieved.

A difference between the nominal value of the process variable and the actual value of the process value is preferably entered into a controller which issues a correcting variable which actuates a drive motor for generating the feed rate.

On account thereof, the correcting variable can have a direct influence on the feed rate.

As mentioned, the process variable can be an axial force, can be a torque, but can also be a motor current, or a pressure of a pneumatic assembly.

It is particularly advantageous for the process variable to be a function of an axial relative force between the tool and the workpiece blank.

It is furthermore preferable for the process variable to be a function of a relative torque between the tool and the workpiece blank.

According to one further preferred embodiment, an axial feed movement is interrupted when an axial relative force between the tool and the workpiece blank exceeds an axial force threshold value, and/or when a relative torque between the tool and the workpiece blank exceeds a torque threshold value.

It is particularly advantageous herein for a reverse stroke directed counter to the feed rate to be carried out after the interruption of the feed movement.

It is assumed herein that the machining process is re-initiated anew after the reverse stroke, thus is restarted from the outset, so to speak.

According to one further preferred embodiment, the work required for machining the workpiece blank is detected. For example, a product of path and torque (or force) over time can be detected and processed herein, for example be mathematically integrated in order for the overall work to be detected.

The work required for machining the workpiece blank can be used, for example, to establish whether a tool is still sufficiently sharp or potentially has to be replaced.

According to one further overall preferred embodiment, which in conjunction with the preamble of claim 1 represents an independent invention, the feed rate is at least in portions superimposed by a relative oscillating movement which preferably has a frequency in a range from 30 Hz to 100 Hz, and/or has an amplitude in a range from 0.5 mm to 4 mm.

On account thereof, the machining rate can yet again be significantly increased in many cases.

It is furthermore overall preferable that prior to generating the relative feed rate a preliminary advance or start-up process, respectively, by way of which it is detected whether machining of the workpiece blank is possible with the tool is carried out.

For example, it can be checked herein whether the workpiece blank has a bore, or a cylindrical workpiece face to be machined, respectively, in the first place. It can optionally furthermore be checked whether a bore is too small or too large.

It is furthermore advantageous, and in conjunction with the preamble of claim 1 represents an independent invention, for the tool to have a conical portion, wherein prior to generating the relative feed rate the workpiece blank and the tool are moved relative to one another until the conical portion contacts an annular edge of the workpiece blank, wherein the axial relative position between the tool and the workpiece blank established herein is detected.

This detection can be an indication of how large the bore which for generating the cylindrical workpiece face has been incorporated in the workpiece is. Said axial relative position can optionally be used for influencing the machining of subsequent workpieces by means of a cutting tool, thus for rendering the subsequent bores somewhat larger or somewhat smaller, for example.

According to one further advantageous embodiment, which in conjunction with the preamble of claim 1 represents an independent invention, the tool has a conical portion, wherein the workpiece blank and the tool are moved relative to one another to a preliminary advance position until at least part of the conical portion overlaps axially with the cylindrical workpiece face but an annular edge of the cylindrical workpiece face is not contacted by the tool.

On account thereof, an initial position for the fine machining process can be rapidly established. By checking whether an axial overlap of the conical portion and the cylindrical workpiece face is possible, it can furthermore be checked whether the cylindrical workpiece face is present in the first place, for example whether a bore is present in the workpiece.

It is particularly advantageous herein when the relative feed rate is generated upon reaching the preliminary advance position, and the process variable is controlled by changing the relative feed rate.

The objective herein lies in bringing the tool into contact with the cylindrical workpiece face as fast as possible, and in machining the latter without exceeding a maximum value of the process variable (for example a maximum torque). The actual controlled fine machining process in this embodiment is thus started before the tool by way of the conical portion contacts the annular edge of the cylindrical workpiece face. This initial contact can be relatively diffuse by virtue of a flat conical angle. This can however also be advantageous, since the process variable in this instance will typically not increase very steeply and by virtue of the controlling there is sufficient time for reducing the relative feed rate. The continuous control process is most particularly suitable for overcoming the distance from the preliminary advance position up to a contacting position, since much time can potentially be saved here and an ideally high preliminary advance rate can thus be targeted and reached.

BRIEF DESCRIPTION OF THE DRAWINGS

It is understood that the features mentioned above and yet to be explained hereunder can be used not only in the respective combination set forth but also in other combinations or individually without departing from the scope of the present invention. In the figures:

FIG. 2 shows a schematic illustration of a fine machining module for carrying out a fine machining method;

FIG. 3 shows an illustration of the fine machining module of FIG. 2, assembled on a tool assembly position of a machine tool, in particular of a machining center;

FIG. 4 shows an alternative embodiment of a device according to the invention for fine machining cylindrical workpiece faces;

DETAILED DESCRIPTION

Figure 1:
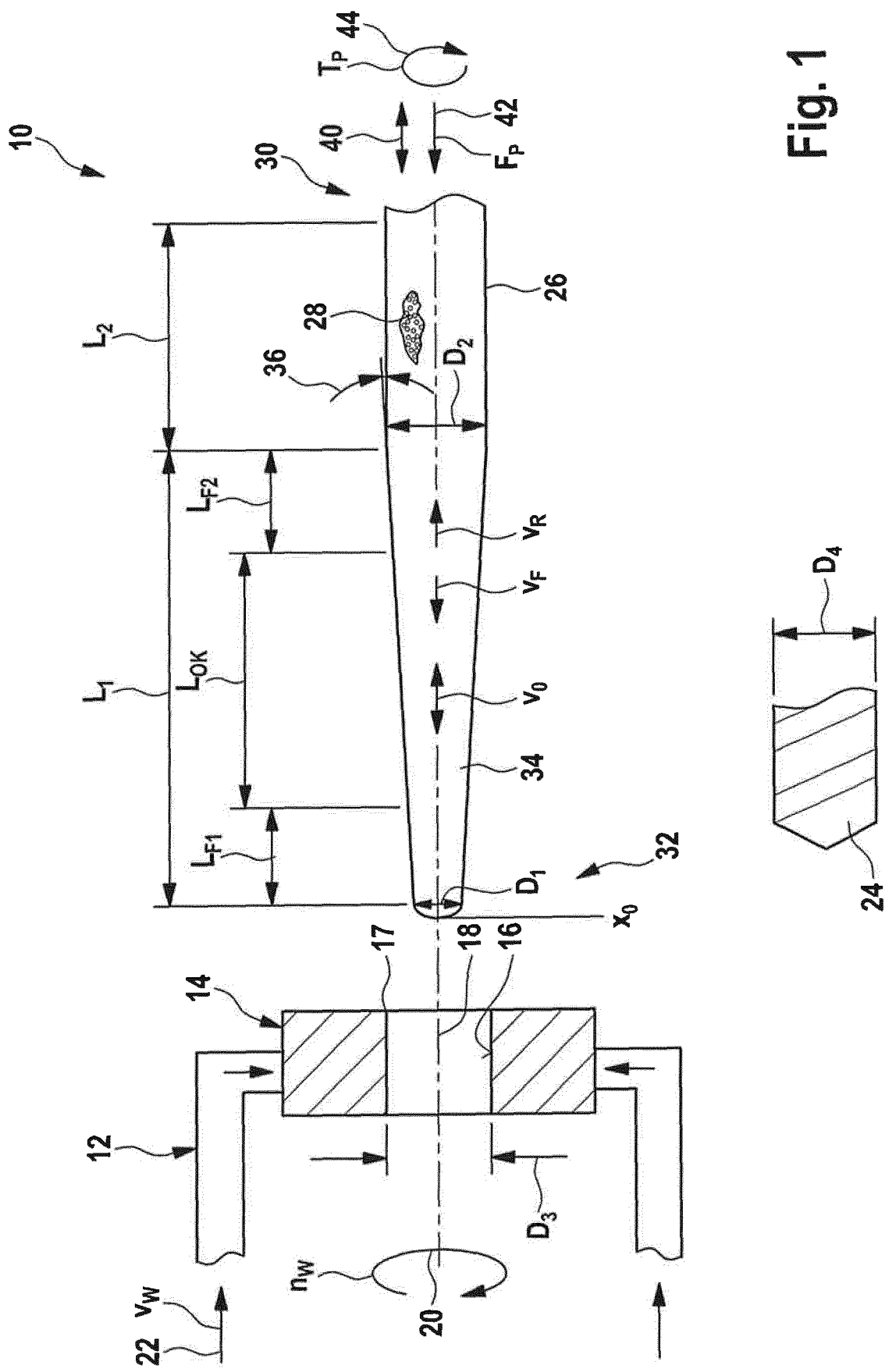
FIG. 1 shows a schematic illustration of a machine tool assembly for carrying out a fine machining method.

A machine tool assembly for machining workpieces is schematically illustrated and in general identified by the reference sign 10 in FIG. 1.

The machine tool assembly 10 includes a clamping installation 12 with the aid of which a workpiece 14 can be clamped. The workpiece 14, which here is also referred to as a workpiece blank, includes a cylindrical workpiece face 16, here in the form of a bore. The cylindrical workpiece face 16 at an end side of the workpiece 14 defines an annular edge 17.

The clamping installation 12 is specified for setting the workpiece 14 in rotation about a longitudinal axis 18, specifically by means of a schematically indicated rotary drive 20 which can set the workpiece 14 in rotation at a rotating speed $n_w$.

The clamping installation 12 can furthermore be assigned a workpiece axial drive 22 by means of which the workpiece 14 can be driven at a feed rate $v_w$ parallel to the longitudinal axis 18. In some cases, the clamping installation 12 can also be configured such that the workpiece 14 is repositionable in a direction transverse to the longitudinal axis 18, so as to be able to assign the workpiece 14 to dissimilar tools which are assembled on the machine tool assembly 10.

The machine tool assembly 10 presently includes, for example, a cutting tool 24 which possesses a defined geometric cutting edge and can be configured, for example, as a drill bit, as a turning tool, or similar. The cutting tool 24 here is configured for providing on a workpiece blank 14 the bore which forms the cylindrical workpiece face 16.

The machine tool assembly 10 here furthermore includes a fine machining tool 26 which can be configured as a honing tool, for example. The fine-machining tool 26 is configured in one part, specifically so as to be substantially mandrel-shaped, having a tool coating 28 which is configured on the external circumference and which can be diamond-based, CBN-based, or similar.

The fine machining tool 26, when viewed in the longitudinal direction, has a first tool end 30, the fine machining tool 26 being able to be clamped in the region of said first tool end 30. The fine machining tool 26 furthermore has an opposite axial second tool end 32. The fine machining tool 26 extends from the clamping mechanism in the region of the first tool end 30 along a longitudinal axis which presently coincides with the longitudinal axis 18 of the tool 14.

The fine machining tool 26 in this projecting region has a conical portion 34 which, proceeding from the second tool end 32, widens in a conical manner, specifically at a cone angle 36 which can be in a range from 0.003° to 0.05°, for example. The conical portion 34 in the region of the second tool end 32 has a first diameter $D_1$ which is larger than 0.

That portion of the fine machining tool 26 that projects from the clamping mechanism furthermore has a shank portion 38 which adjoins the conical portion 34 and possesses a consistent second diameter $D_2$. A difference between the diameter $D_2$ and the diameter $D_1$ is preferably in a range from 0.5 mm to 0.005 mm. The ratio of $D_2$ to $D_1$ is preferably in a range from 10:1 to 2:1.

The fine machining tool 26 is movable in the axial direction by means of a linear drive 40. A schematically indicated axial force sensor 42 is configured for measuring an axial force $F_P$ which represents a relative force between the tool 26 and the workpiece 14. Furthermore provided is a torque sensor 44 by means of which a relative torque $T_P$ between the tool 26 and the workpiece 14 can be measured.

The conical portion 34 has a first axial length $L_1$. The shank portion 38 has a second axial length $L_2$. The ratio of $L_1$ to $L_2$ is preferably in a range from 10:1 to 1:2, in particular from 3:1 to 1:1, preferably in a range from 2.5:1 to 1.25:1.

The cutting tool 24 has a diameter $D_4$, so as to generate a bore having a diameter $D_3$ on the workpiece 14. The value of $D_3$, which can also be referred to as a blank diameter, is preferably lower than the value of $D_2$.

When the fine machining tool 26 is introduced into the bore for the first time, the annular edge 17 comes to bear on the conical portion 34. The axial length $L_1$ of the conical portion 34 according to FIG. 1 is subdivided into three axial lengths $L_{F1}, L_{OK}, L_{F2}$. $L_{F1}$ is adjacent to the second tool end 32. $L_{F2}$ is adjacent to the shank portion 38. The portion $L_{OK}$ lies between the portions $L_{F1}$ and $L_{F2}$.

If the annular edge 17 upon initial contact comes to bear on the conical portion 34 in the region $L_{OK}$, the bore has been produced with a correct diameter $D_3$. If the annular edge 17 comes to bear on the conical portion 34 within the region $L_{F1}$, the diameter $D_3$ is too small, so that the workpiece 14 is not correct and cannot be machined. If the annular edge 17 comes to bear on the conical portion 34 in the region of the portion $L_{F2}$, the diameter $D_3$ is too large and the workpiece 14 is preferably removed as a reject.

In the case of workpieces 14 which are correct according to the above definition, it can be measured at which location of the region $L_{OK}$ the annular edge 17 comes to bear on the conical portion 34.

This value can be evaluated for several purposes. On the one hand, a message can optionally be generated to the effect that subsequent workpieces are provided having a somewhat larger or a somewhat smaller bore so as to ideally make initial contact in the center of the region $L_{OK}$. This information can furthermore be evaluated with a view to the fine machining tool 26 potentially having been subjected to certain wear in terms of the tool coating 28 thereof, so that this information can also be used for monitoring the tool quality of the fine machining tool 26.

The fine machining tool 26 by means of the linear drive 40 can be moved in a feed direction $v_F$, thus in the direction toward the workpiece 14. The fine machining tool 26 by means of the linear drive 40 can also be moved in the opposite direction, as is indicated in FIG. 1 by a reverse stroke $v_R$.

A method for fine machining the cylindrical workpiece face 16 of the workpiece 14, or of the workpiece blank 14, respectively, by means of the fine machining tool 26 preferably comprises the following steps: on the one hand, a relative rotation between the tool 26 and the workpiece blank 14 about the machining axis 18 is generated, specifically by means of the rotary drive 20 of the clamping installation 12, for example, or by means of a rotary drive for the tool. Furthermore, a relative feed rate $v_F$ between the tool 26 and the workpiece blank 14 along the longitudinal axis, or machining axis 18, respectively, is generated. This preferably takes place by means of the linear drive 40, but can also take place by the axial drive 22, or a combination of both.

Furthermore, an actual value of a process variable is detected, said process variable being a function of a relative force between the tool 26 and the workpiece blank 14 and potentially assuming a multiplicity of process variable values. The process variable can be, for example, the relative torque $T_P$, but can also be the axial relative force $F_P$. Furthermore, the process variable can be, for example, an electric motor current of an electric drive motor of the linear drive 40, or a pneumatic pressure, in so far as the linear drive 40 acts on the fine machining tool 26 by way of a pneumatic assembly, for example.

In the fine machining, an initial contact then takes place between the conical portion 34 and the annular edge 17.

Subsequently, the relative feed rate is furthermore set, and the cylindrical workpiece face 16 is fine machined on account thereof. The process variable $T_P$; $F_P$ is continuously controlled herein, specifically by changing the relative feed rate $v_F$ in such a manner that the more an actual value of the process variable $T_P$; $F_P$ deviates from a nominal value of said process variable, the more the relative feed rate changes.

In other words, the feed is performed depending on the detection of the process variable, wherein the continuous controlling of said process variable preferably takes place by way of a proportional controller.

At some time in the process, the shank portion 38 makes its way into the bore of the workpiece 14. The above process is continued herein. A reverse stroke can be subsequently performed. Optionally, a single reverse stroke can also be carried out during the process, or a plurality of reverse strokes can be carried out according to requirements, in particular for clearing out chips in this way when the axial length of the cylindrical workpiece face 16 is long.

The feed movement $v_F$ in some variants of the process can be superimposed by an oscillating movement which in FIG. 1 is schematically indicated at vo. The oscillating movement can have a frequency in a range from 30 Hz to 100 Hz and/or an amplitude in a range from 0.5 mm to 4 mm. The carrying out of a fine machining process, in particular a honing process, can take place while using a fine machining tool as is described above and below. The relative movement between the tool and the workpiece herein can be controlled in terms of the feed rate, as has been discussed above. However, the feed in other embodiments can also take place in a non-controlled manner. In this case, the additional oscillation can be advantageous, in particular in the above-mentioned operative regions, for example also while using a tool such as is used in mandrel honing. An additional oscillating movement by virtue of the mass inertia of the tool and of the tool spindle as well as of a deflection slide is advantageously implemented by means of the workpiece. The relatively small moving mass herein enables the above-mentioned oscillation frequencies without the machine emitting excessive vibrations to the environment. An axial deflection has to be braced during the machining by way of the oscillation. An axial pretensioning force can be increased, for example.

It is understood that the process can preferably be carried out while adding a suitable lubricating fluid, for example a honing oil or the like.

Further embodiments of machine tools or of fine machining modules for machine tools, respectively, which are all based on the method described above will be described hereunder. In general, the design and the construction as well as the function of the machine tools or fine machining modules, respectively, described hereunder is therefore to be considered to be identical to the features described above. Identical elements are therefore identified by the same reference signs. The points of differentiation are substantially explained hereunder.

A fine machining module 50 for a machine tool assembly 10' is schematically illustrated in FIG. 2.

The fine machining module 50 includes a module housing 52 which has an axial length $L_3$. A slide 54 within the module housing 52 is movable in the axial direction between a position $x_0$ and a position $x_{MAX}$, specifically by means of a linear drive 40' which is schematically indicated in FIG. 2.

As is also the case in the preceding embodiments, the linear drive 40' can be implemented by an electric motor in conjunction with a rotary/translatory converter, by an electric linear motor or the like.

Furthermore, the fine machining module 50 includes a control installation 56 which is connectable to the module housing 52 and can be configured, for example, as a control terminal for disposal beside the machine tool assembly 10'.

The fine machining tool 26 in the region of the first tool end 30 thereof is mounted on the slide 54, specifically by means of a cardanic mounting 58.

The slide 54 includes a slide base 60 which is coupled to a drive member of the linear drive 40', as well as a sliding gate 62. The sliding gate 62 is coupled to the slide base 60 by way of an axial spring assembly 64. The first tool end 30 of the fine machining tool 26 is mounted on the sliding gate 62. The axial force sensor 42' is configured for detecting a relative displacement between the slide base 60 and the sliding gate 62. Furthermore provided is a torque sensor 44' which can detect a relative rotation between the fine machining tool 26 (or a clamping installation rigidly connected thereto) and the slide 54 or the module housing 52, respectively.

It is indicated in FIG. 2 that the relative position between the slide base 60 and the sliding gate 62 can move in a range between $A_0$ and $A_{MAX}$.

The module housing 52 has a housing wall 66 on which a tool guide 68 is configured. The tool guide 68 is configured for guiding the second tool end 32 of the fine machining tool 26, in particular in a manner concentric with the machining axis 18. A supply for process fluid can be integrated in the tool guide 68.

In the zero position $x_0$ of the slide 54, the latter is situated in the region of an axial end of the module housing 52, specifically of that axial end that lies axially opposite the housing wall 66. The fine machining tool 26 in this position extends substantially within the module housing, wherein the second axial tool end 32 extends up to the tool guide 68.

The maximum stroke between the position $x_0$ and the maximum deflection $x_{MAX}$ of the slide 54 in FIG. 2 is indicated at $L_4$. This stroke $L_4$ is so large that the fine machining tool 26 by way of both the conical portion 34 as well as by way of the shank portion 38 (having the lengths $L_1$ and $L_2$) can extend out of the module housing 52 so as to perform machining on a workpiece 14 which is disposed outside the module housing 52, specifically and preferably clamped by means of a clamping installation 12' of the machine tool assembly 10'.

The linear drive 40 is disposed so as to overlap axially with the module housing 52, or overlap axially with the fine machining tool 26, respectively. The linear drive 40 can be integrated in the module housing 52. A ratio between the axial module length $L_3$ and the maximum path distance (stroke) $L_4$ of the slide 54 is preferably in a range from 1.3:1 to 2.5:1, preferably in a range from 1.4:1 to 2.2:1.

Consequently, the fine machining module 50 can be implemented so as to be compact in the axial direction.

An exemplary machine tool assembly 10' which includes a clamping installation 12' which is rotatable about a machining axis or longitudinal axis, respectively, and is conceived for clamping a workpiece 14 is shown in FIG. 3.

The machine tool can in particular be configured as a turning machine and has a machining space 74 which can be closed by means of a door 76, as is indicated by an arrow in FIG. 3.

A tool assembly location 78 where different cutting tools 24, 24' can be fixed, for example, is configured within the machining space 74. Furthermore, the fine machining module 50 of FIG. 2 can be fixed to the tool assembly location 78. It is illustrated in FIG. 3 that the longitudinal axis 18 of the fine machining module 50 is aligned with the machining axis 18 of the machine tool assembly. Consequently, fine machining of the clamped workpiece 14 can take place in this relative position.

In some embodiments, the clamping installation 12' can also be repositioned transversely to the axis 18 so as to be able to carry out machining on the workpiece 14 by means of other cutting tools 24, 24'.

It is furthermore indicated in FIG. 2 that the control installation 56 of the fine machining module 50 can be disposed outside of a housing (not referred to in more detail) of the machine tool assembly 10' and can be connected to the fine machining module 50 by way of a cable harness (not illustrated in more detail).

The module 50 herein is configured as a replacement module or as an add-on module, respectively, for the machine tool assembly 10' and can be operated independently of the machine tool assembly 10'. In order for a fine machining process by means of the fine machining module 50 to be initiated, a workpiece 14 having a cylindrical bore is clamped in the clamping installation 12' and is brought to be in alignment with the axis of the fine machining module 50, as shown in FIG. 3. Prior to initiating the fine machining process, the workpiece 14 is subsequently set in rotation by means of a rotary drive 20 (not illustrated in more detail). The rotating speed can be in a range between 500 revolutions/minute to 10,000 revolutions/minute, and preferably in a range of more than 5000 revolutions/minute.

The rotating speed $n_w$ of the workpiece 14 is preferably controlled to a constant rotating speed. As soon as the rotating speed has been established, the fine machining process can start, wherein the slide 54 is moved at a relative feed rate in the direction toward the workpiece 14 in such a manner that the conical portion is introduced through the tool guide 68 into the bore of the workpiece 14 until the annular edge 17 (see FIG. 1) comes to bear on the conical portion 34.

The relative feed rate $v_F$ herein is set to a preferred value. Furthermore, an actual value of a process variable $T_P$ or $F_P$ is detected. A specific nominal value is predefined for the process variable. The process variable is subsequently continuously controlled, in particular in a proportional manner, specifically by changing the relative feed rate $v_F$ in such a manner that the more an actual value of the process variable deviates from a nominal value of the process variable, the more the relative feed rate $v_F$ changes.

A difference between the nominal value of the process variable and the actual value of the process variable herein is preferably entered into a controller such as a P controller, a PI controller, or a PID controller, wherein said controller issues a correcting variable which actuates a drive motor of the linear drive 40' for generating the feed rate $v_F$.

On account thereof, the fine machining tool 26 penetrates the bore to an ever-deeper extent, until said fine machining tool 26 by way of the second end 32 exits the end side that lies opposite the annular edge 17. The bore diameter herein can be rendered to a desired nominal dimension by way of the shank portion 38.

Shape defects of a bore produced by means of a cutting tool 24, for example out-of-roundness, oversized tapers, undulations, conicities, or banana shapes, can be minimized or even completely eliminated by this fine machining process. Dimensional accuracies of a few micrometers can be achieved.

The process is stable and force-controlled, having a minimum scatter in terms of shape, surface, and dimension. The system can moreover be implemented in a relatively simple manner since neither the shape nor the diameter dimensions have to be set or maintained by measuring or controlling. Rather, the final dimension of the bore is derived from the diameter $D_2$ of the shank portion 38.

On account of the cardanic mounting 58, the fine machining tool 26 herein can slightly bend between the clamping mechanism and the tool guide 68, such that a certain elasticity results in the axial direction. The cardanic mounting 58 has in particular the following tasks: on the one hand, compensating the position and angular errors between the machine tool and the fine machining module. On the other hand, compensating tolerances in the movement of the fine machining module; furthermore compensating the position and angular errors of tolerances of the inherent straightness of the fine machining tool 26 and of curvatures of the fine machining tool 26 by virtue of an axial load.

The slide 54 can furthermore be assigned an axial detent sensor which detects, for example, when the fine machining tool 26, despite the predefined feed rate $v_F$ thereof, no longer moves in an axial manner. Said axial detent sensor can, for example, correspond to a maximum deflection $A_{MAX}$ of the sliding gate 62 in relation to the slide base 60. The axial detent sensor can typically be based on an indirect or direct analog force measurement. For example, the axial detent sensor herein can be pretensioned by way of a spring or a compressed-air piston such that the axial detent sensor typically switches just short of reaching the maximum deflection, specifically close to $A_0$ such that the remainder of the path to $A_{MAX}$ can serve as a "crumple zone" until the feed has stopped.

In one preferred embodiment, the torque sensor 44' operates as a quasi-analog sensor which can detect a multiplicity of torque values. By contrast, the axial force sensor 42' can be configured as the axial detent sensor described above. In other embodiments, not the torque $T_P$ but alternatively an axial force $F_P$ can be resorted to as the process variable. Furthermore, the process variable can be formed by a combination of said variables.

As soon as the fine machining process has been completed, the control device 56 can transmit a completion signal to the controller of the machine tool, said controller then being able to terminate the rotation of the clamping installation 12' so as to be able to retrieve the completed and fine-machined workpiece 14 in this way.

An alternative embodiment of a machine tool assembly 10" in which the machine tool assembly 10" overall is configured as a fine machining tool is shown in FIG. 4. A fine machining tool 26' herein is able to be set in motion in the feed direction and driven in the rotating direction by means of a linear drive 40" and a rotary drive 20", as is indicated at v and w, respectively, in FIG. 4. The machine tool assembly 10" can optionally be configured for implementing the rapid stroke up to a preliminary advance position by moving the respective workpiece to be machined.

In a machine tool of this type, a plurality of workpieces 14a, 14b can be disposed on a workpiece receptacle 84, for example, which is disposed within a machine tool housing 82.

The workpiece receptacle 84 can be configured as a rotary plate so as to bring in each case one workpiece 14a, 14b in alignment with a longitudinal axis 18" of the fine machining tool 26', wherein the axis 18" in this embodiment is preferably vertically aligned.

It is optionally also no longer necessary for a cardanic mounting 58 to be provided herein. Whether or not a cardanic mounting is expedient depends in particular on the diameter of the tool and on the clamping length. The workpiece can possibly also be mounted in a cardanic manner.

Figure 5:
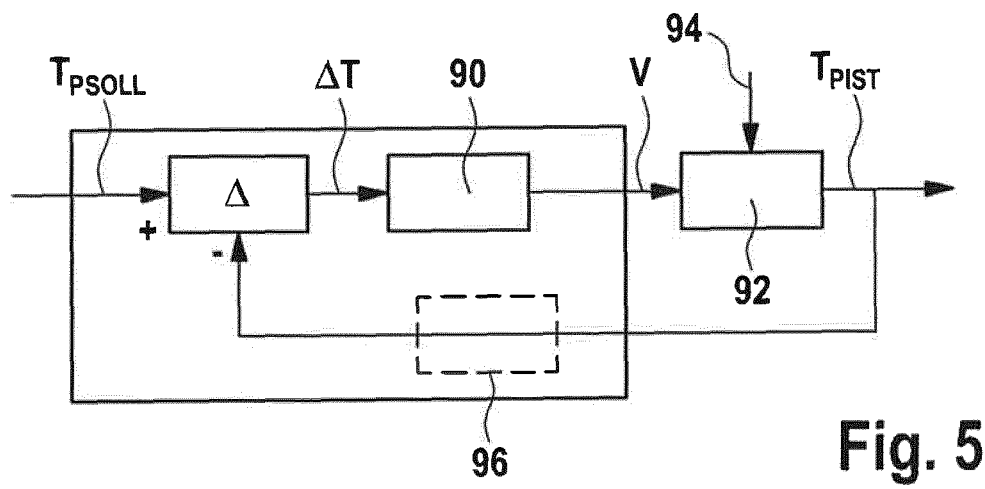
FIG. 5 shows an illustration of a feedback control circuit for use in a control device of a fine machining device according to the invention.

A feedback control circuit which includes a continuous controller such as a proportional controller 90 is schematically illustrated in FIG. 5.

The feedback control circuit is conceived for controlling the relative torque $T_P$ between the tool 26 and the workpiece 14 as the process variable. The process is represented by the control section 92. At least one disturbing variable 94 acts on the control section 92. The result is an actual value $T_{PIST}$ of the relative torque, said actual value $T_{PIST}$ being detectable by means of the torque sensor 44.

A nominal torque $T_{PSOLL}$ is furthermore predefined for the process. The difference between the actual torque $T_{PIST}$ and the nominal torque $T_{PSOLL}$ is formed in a differential calculator $\Delta$ and is entered as a differential value or control deviation $\Delta T$ into the controller 90. The controller generates therefrom a correcting variable which here is the relative feed rate v. The control section 92 is impinged with said correcting variable, on account of which the actual torque $T_{PIST}$ is indirectly influenced.

A measuring transducer 96 can optionally be provided in the return line from the actual torque to the differential calculator, so as to return another optionally detectable process variable and to convert the latter to a corresponding torque value. The measuring transducer 96 can, for example, convert an output of a torque sensor in the form of a path or of a spring force to a torque value.

Figure 6:
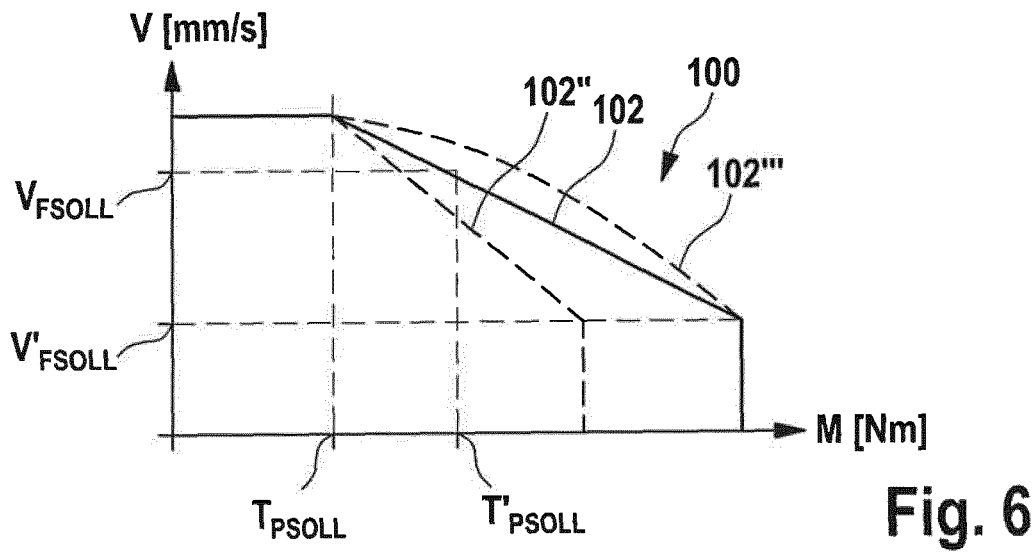
FIG. 6 shows an exemplary controlling characteristic of the feedback control circuit of FIG. 5.

FIG. 6 shows a diagram 100 of a control characteristic of the correcting variable v over the torque T.

The control characteristic includes a straight portion having a constant feed rate v at $v_{FSOLL}$ which is predefined for a torque T from 0 up to a nominal torque $T_{PSOLL}$. The fine machining process is to be carried out at this value pairing $T_{PSOLL}$, $v_{FSOLL}$.

Should the torque T exceed said value, the feed rate v is reduced, specifically in a proportional manner as is indicated by the linear portion of the linear characteristic line 102.

Above a maximum torque $T_{MAX}$ (the feed rate is immediately decreased to 0. This can take place, for example, when an axial detent sensor (for example 42' in FIG. 2) emits a signal. After the reduction of the feed rate v to 0, a reverse stroke can subsequently be initiated, this however not being illustrated in more detail in FIG. 6. This typically also does not take place within the scope of the controlling of FIG. 5.

It is illustrated with dashed lines in FIG. 6 that the gradient of the characteristic line 102 is variable. A steeper characteristic line 102" means a higher proportional value of the proportional controller 90. The latter in this instance responds faster to changes; the stability can optionally be somewhat reduced on account thereof.

The gradient of the linear path distance 102, 102" can be suitably adapted, optionally also during the operation.

It is furthermore shown at 102''' that the characteristic line does not have to be purely linear but can also be embodied in a curved manner so as to achieve different gradients of the characteristic line 102, or proportional values, respectively, for different control deviations from the nominal value $T_{PSOLL}$.

It is furthermore shown in FIG. 6 that the operative point does not necessarily have to lie at the end of the linear characteristic line 102 but can also lie on the characteristic line, as is indicated at $T_{PSOLL}$, $v_{FSOLL}$ in FIG. 6. In the event of a nominal torque being undershot in this case, the feed rate can optionally even be increased.

Figure 7:
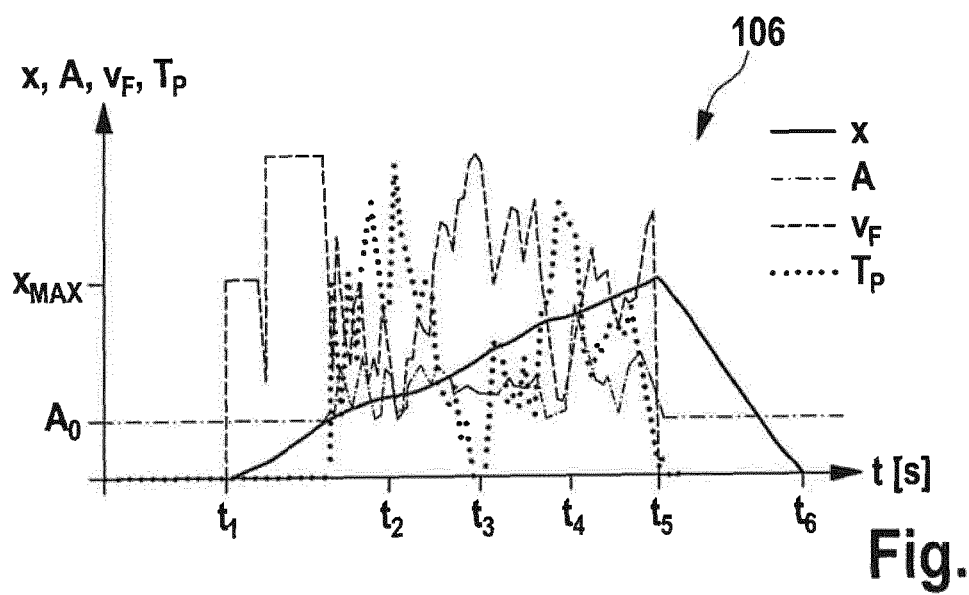
FIG. 7 shows a time-sequence diagram of various state variables of an exemplary fine machining process for machining a cylindrical workpiece face of a workpiece.

FIG. 7 shows a time-sequence diagram 106 for a fine machining process of the type according to the invention.

Plotted over the time t in FIG. 7 are: the position x of the slide, the axial deflection force A of the sliding gate 62 in relation to the slide base 60, the feed rate $v_F$, as well as the torque $T_P$.

The sliding gate 62 is always slightly pretensioned in relation to the slide base 60, such that the axial spring assembly 64 of FIG. 2 is always at a certain pretension. On account thereof, the deflection force $A_0$ is greater than 0 at the time point 0.

The feed rate $v_F$ is increased at the time point $t_1$, specifically to a relatively low value, until a preliminary advance position has been reached (between $t_1$ and $t_2$). The feed rate $v_F$ is subsequently increased therebeyond such that the fine machining tool 26 rapidly approaches the workpiece 14. The torque $T_P$ herein is equal to 0.

At the time point $t_2$ the fine machining tool 26 contacts the workpiece 14 such that the torque $T_P$ increases. This likewise leads to a certain deflection A, wherein the sliding gate 62 is pushed toward the slide base 60. Furthermore, the feed rate $v_F$ is reduced on account thereof.

As soon as the torque $T_P$ has exceeded the nominal torque the feed rate $v_F$ is correspondingly reduced.

For example, the torque $T_P$ can however severely drop on account of a reduction in the feed rate $v_F$, whereupon the latter is again increased, as is shown from $t_3$ onward.

The opposite is the case at $t_4$. A relatively high torque $T_P$ results here, on account of which the feed rate $v_F$ is lowered.

By virtue of the characteristic of the proportional controller, the above happens in a quasi-simultaneous manner such that very positive controlling can be achieved.

The maximum value $x_{MAX}$, or a value shortly prior thereto, is achieved at the time point $t_5$. The shank portion 38 herein has already come into contact with the cylindrical workpiece face 16. Therefore, at the time point is a reverse stroke is performed up to the time point $t_6$, on account of which the initial position is reached again, thus the slide has again returned back to the point $x_0$.

It can be seen that the feed of the fine machining tool 26 into the workpiece 14 and through the latter takes place continuously, thus no reverse stroke is required, until the maximum value $x_{MAX}$ is reached.

On account thereof, the machining rate can be significantly increased in comparison to known methods.

Figure 8:
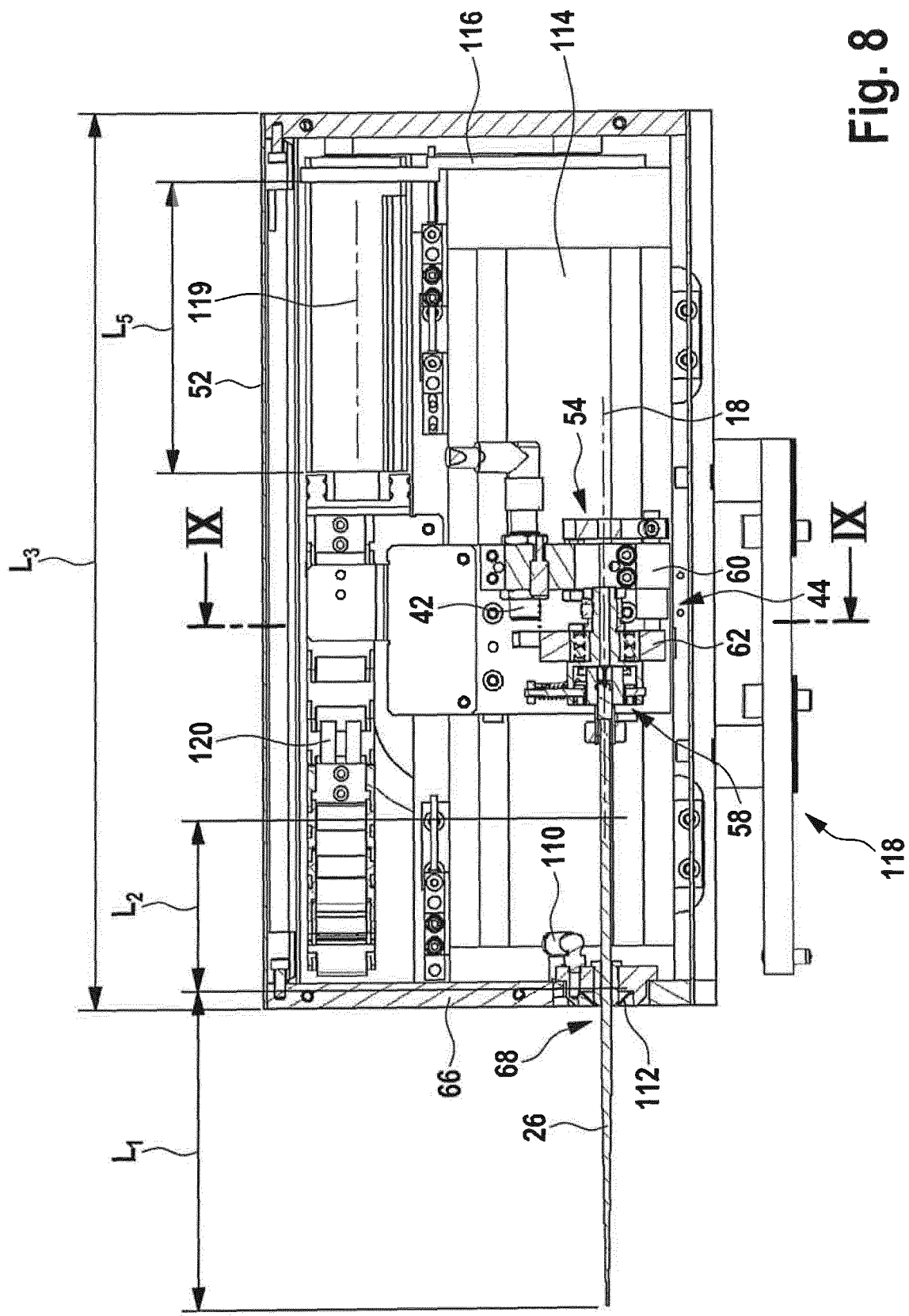
FIG. 8 shows a schematic longitudinal sectional view through a fine machining module for carrying out a fine machining method.
Figure 9:
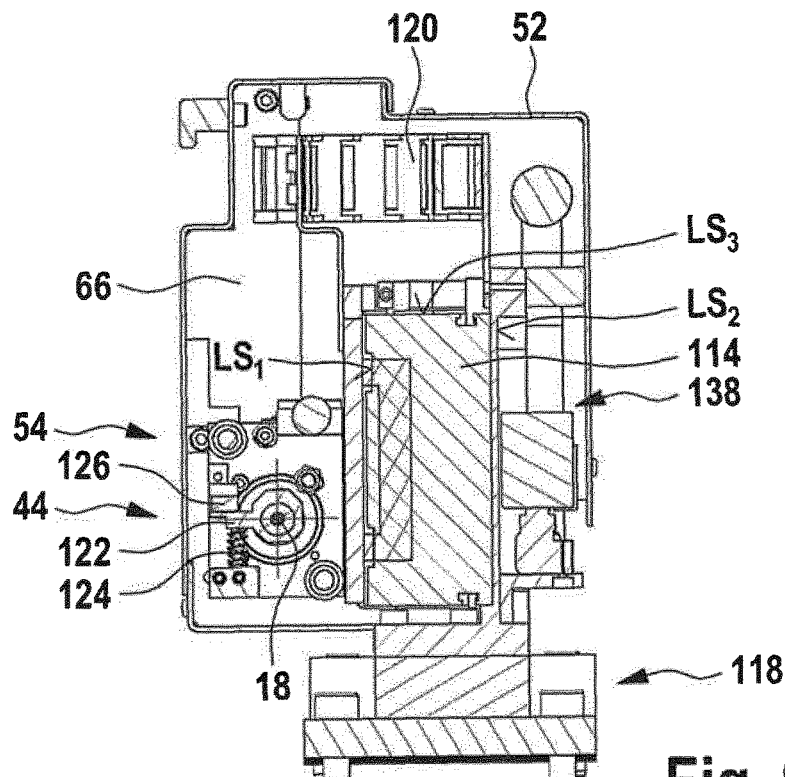
FIG. 9 shows a sectional view along the line IX-IX of FIG. 8.
Figure 10:
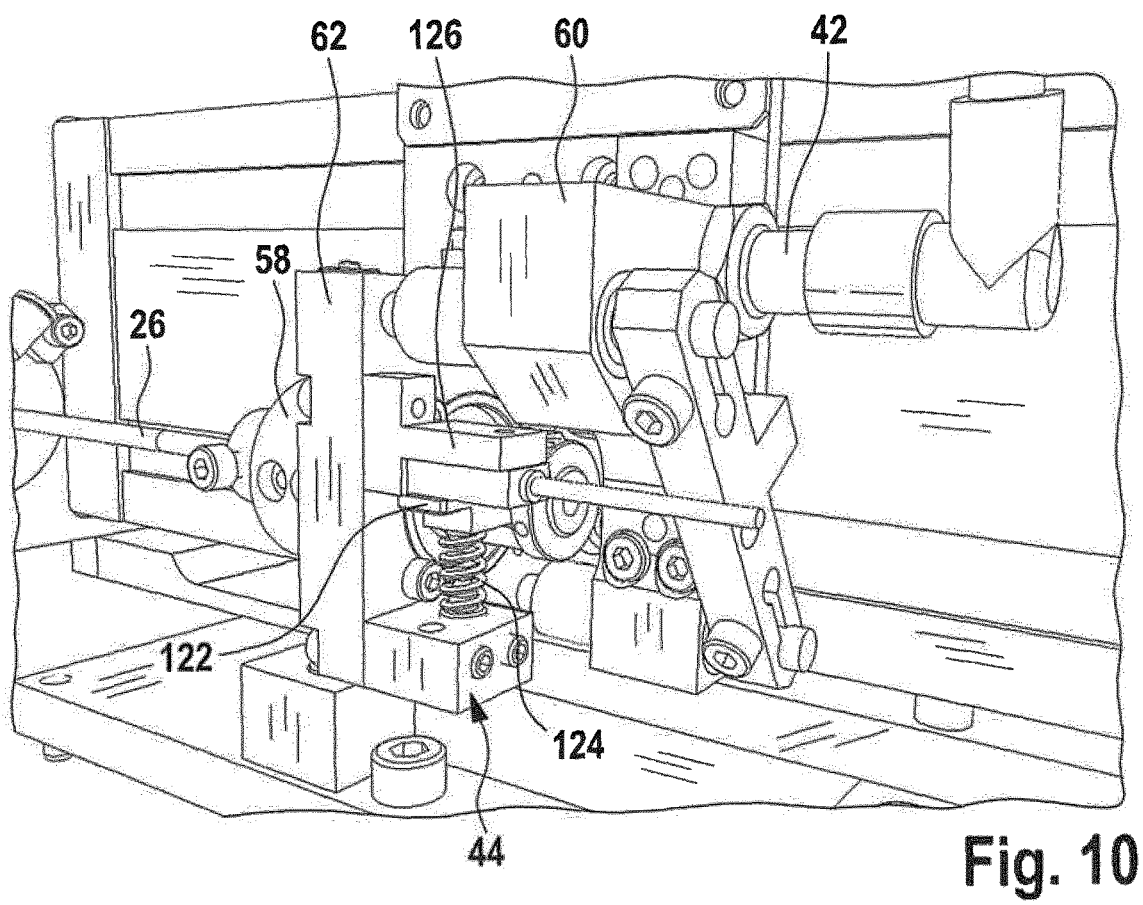
FIG. 10 shows a perspective detailed view of a slide of the fine machining module of FIG. 8.

A further embodiment of a fine machining module 50 is shown in FIGS. 8 to 10, said further embodiment in terms of design and functional mode in general corresponding to the fine machining module 50 of FIG. 2. Identical elements are therefore identified by the same reference signs. The point of differentiation will be substantially explained hereunder.

It can be seen on the one hand that the tool guide 68 can include a coolant supply 110, as well as coolant nozzles 112 by way of which the coolant can be applied to the surface of the fine machining tool 26 that is guided through the tool guide 68.

The linear drive 40 presently includes a linear axis 114 on which the slide 54 is guided, as well as a traction means gearbox 116. The linear axis 114 includes a rotary/translatory converter and converts a rotary movement of the traction means gearbox 116 to a corresponding linear movement of the slide 54. The traction means gearbox 116 is furthermore coupled to a drive motor 119 which possesses a length $L_5$. The drive motor 119 is configured as an electric drive motor having an indicated rotation axis by way of which the traction means gearbox 116 can be driven such that rotary movements of the drive motor 119 can be introduced into the linear axis 114 in order for the slide 54 to be moved in a linear manner.

An assembly plate 118 by way of which the fine machining module 50 can be assembled on a tool assembly location 78 of a machine tool 10' can be configured on the lower side of the module housing 52. It is understood that an alignment of the machining axis 18 with an axis of the clamping installation 12' can be achievable by way of suitable levelling means.

As is shown in FIG. 9, the slide 54 is disposed on a longitudinal side $LS_1$ of the linear axis 114. A cable guide, or a cable chain, 120, respectively, by way of which the signals of sensors of the slide 54 can be guided in corresponding signal lines is disposed on a neighboring upper longitudinal side $LS_3$.

It is moreover shown in FIGS. 9 and 10 that the torque sensor 44 can include a lever 122 which is connected to a clamping installation, or a cardanic mounting 58, respectively, of the fine machining tool 26 and projects radially in relation to the machining axis 18. The lever 122 by way of a spring 124 is pretensioned in relation to a distance sensor 126.

When torques arise between the fine machining tool 26 and the workpiece 14, the fine machining tool 26 is deflected in the circumferential direction, on account of which the lever 122, counter to the force of the spring 124, moves away from the distance sensor 126. The distance sensor 126 can thus deliver an in particular proportional signal which corresponds to the torque.

It is shown in FIG. 9 that a control installation 138, which can be connected to a stationary control device 56 which is disposed outside the module housing 52, can be disposed on a longitudinal side $LS_2$ which in the transverse direction lies opposite the first longitudinal side $LS_1$.

The cable guide 120 is disposed on the third longitudinal side $LS_3$.

All construction elements intersect in the axial direction with the linear axis 114. Consequently, the fine machining module 50 can be implemented so as to be axially compact.

Furthermore to be seen in FIGS. 8 and 10 is an axial force sensor 42 which is typically an analog indirect or direct force measurement sensor. For example, the axial force sensor 42 can include a path sensor which detects a path of the sliding gate 62 which is axially pretensioned in relation to the slide base 60. To this end, the axial force sensor 42 here can be configured as a detent sensor so as to detect the value of the maximum deflection $A_{MAX}$. Furthermore, such a detent sensor can typically switch close to $A_0$ such that the remainder of the path to $A_{MAX}$ can be utilized as a "crumple zone" until the feed has been stopped.

It is furthermore understood that terminal switches for the slide 54 can be provided on the module housing, in particular above the linear axis 114, said terminal switches however not being referred to in more detail in FIG. 8.

The cardanic mounting 58 can include a weight compensation mechanism. Furthermore, an overload sensor (not referred to in more detail) for safeguarding the process can be provided in the region of the cardanic mounting. Furthermore, a connection piece between the fine machining tool 26 and a tool receptacle of the cardanic mounting 58 can be provided as a sacrificial overload part with a predetermined breaking point so as to be able to preclude any damage to the slide or other components of the fine machining module 50 in the case of a fatal malfunction.

Figure 11:
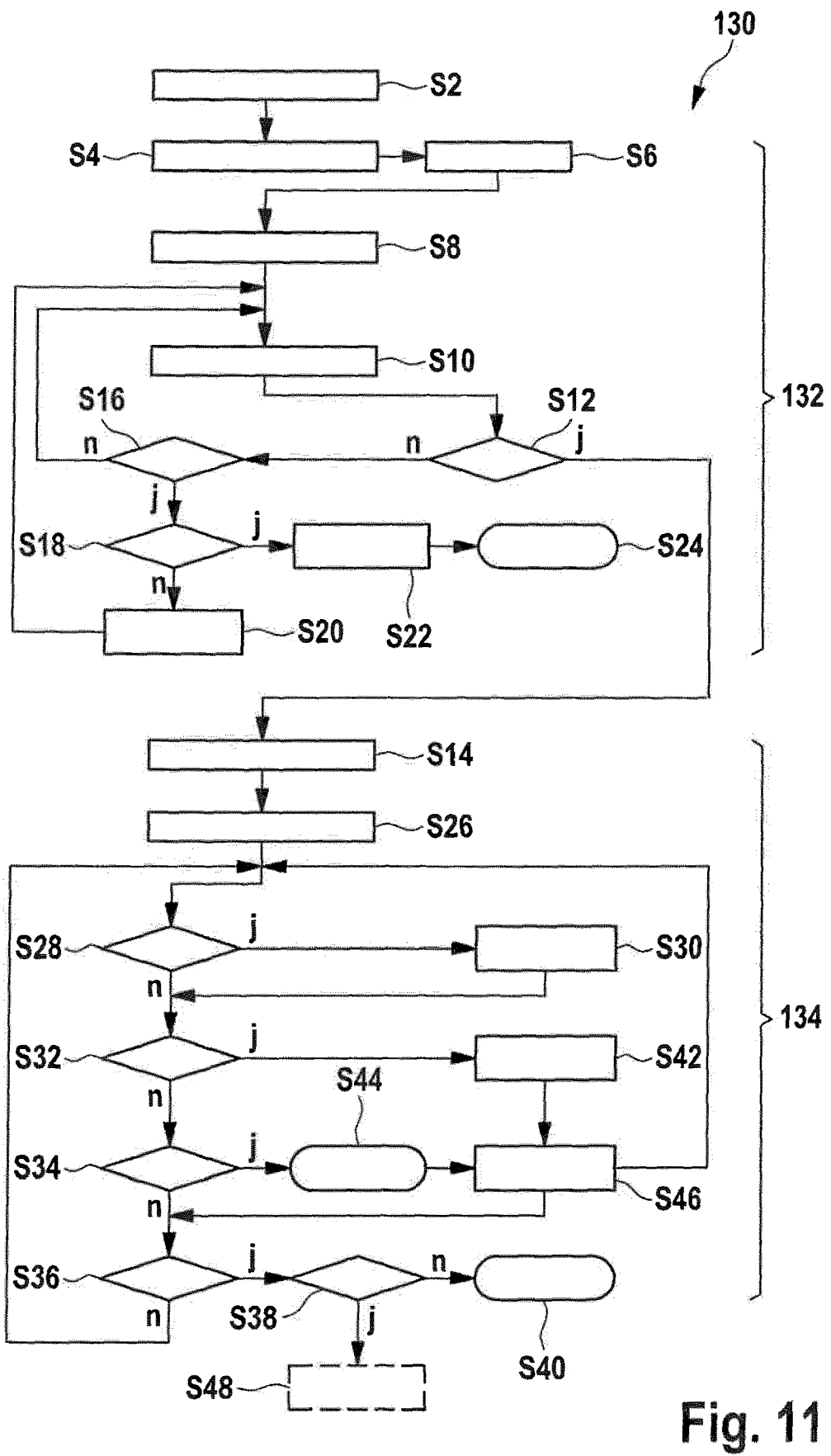
FIG. 11 shows a flow chart of a method for fine machining a cylindrical workpiece face.

A flow diagram 130 which illustrates a process for fine machining a cylindrical workpiece face of a workpiece blank by means of a fine machining tool is illustrated in FIG. 11.

The process commences with a preliminary advancing process 132, on account of which the fine machining tool 26 is moved to a position in which the conical portion 34 is just short of contacting the annular edge 17. The actual machining process 134 takes place thereafter, wherein the relative feed rate is yet again significantly increased.

The machining cycle commences with the preliminary advancing process 132, specifically at $S_2$.

An axial nominal deflection force is subsequently set to "preliminary advance". Furthermore, a rotating speed of the workpiece or the tool is set to "preliminary advance", thus to a relatively high rotating speed ($S_4$).

In step $S_6$ a counter for reverse strokes is set to "0".

In a subsequent step $S_8$ a relative feed rate v is set to "preliminary advance feed".

In step $S_{10}$, preliminary advancing of the fine machining tool 26 into the workpiece 14 takes place.

In step $S_{12}$ it is checked whether a preliminary advance position short of a machining position (that is to say contact between the conical portion 34 and the annular edge 17) has already been reached.

If this is the case (yes in step $S_{12}$), the process moves to the machining process 134, in which in step $S_{14}$ the axial deflection force is first set to "maximum machining". Furthermore, the rotating speed of the workpiece or the tool is set to "machining".

In step $S_{26}$ the feed rate is subsequently set to "maximum machining", corresponding to the value $v_{FSOLL}$ in FIG. 6.

Should the response in step $S_{12}$ have been no, it is checked in step $S_{16}$ whether an axial deflection force or a torque for "preliminary advance" has been exceeded. Should this not be the case, the method returns to the beginning of step $S_{10}$. If the force or the torque has been exceeded it is checked in step $S_{18}$ whether a counter for a maximum number of reverse strokes has been exceeded.

If this is not the case, the counter for reverse strokes is incremented in step $S_{20}$, and the method and the method returns to the beginning of step $S_{10}$. If the maximum number of reverse strokes has been exceeded, a cycle "abort" is carried out in step $S_{22}$. An error message "preliminary advance not possible" occurs and the slide 54 is moved back to a "loading position". The machining is aborted ($S_{24}$).

After step $S_{26}$ in the machining process, a step $S_{28}$ in which it is checked whether a machining torque/torque $T_P$ is present. If this is the case, the controlling according to FIG. 5, FIG. 6 is carried out in step $S_{30}$, wherein the feed rate is set according to the controller setting (for example, linear-proportional).

After the steps $S_{28}$ and $S_{30}$ it is checked in step $S_{32}$ whether a torque threshold value has been exceeded, or a maximum deflection A has been exceeded. When one of said conditions is met, the feed is stopped in step $S_{42}$, and a reverse stroke takes place in step $S_{46}$, as well as subsequently a restart according to the parameterization, that is to say back to the beginning of step $S_{28}$.

Should none of the conditions have been met in step $S_{32}$, it is checked in step $S_{34}$ whether the maximum machining time has been exceeded. Should this be the case, a return movement to the "loading position" takes place in step $S_{44}$, and the machining is discontinued. This may be the case, for example, when a bore produced by the cutting tool 24 has an insufficiently large diameter $D_3$.

In step $S_{36}$ (no in step $S_{34}$) it is checked whether a machining terminal position has been reached (corresponding to $x_{MAX}$ in FIG. 7). If this is the case, the machining process 134 is completed. It can be checked in step $S_{38}$ herein whether so-called "sparking out" is to take place.

Sparking out herein is understood in that the machining tool by way of the shank portion is yet again moved back and forth at least once or twice within the bore in order for a calibrated surface to be obtained.

If no sparking out is to take place, a return movement to the loading position takes place in step $S_{40}$, and the machining process is terminated.

Otherwise, a sparking-out process takes place in step $S_{48}$.

The invention claimed is:

1. A method for fine machining a cylindrical workpiece face of a workpiece blank by means of a fine machining tool, said method comprising the following steps:
generating a relative rotation between the fine machining tool and the workpiece blank about a machining axis which is concentric with the cylindrical workpiece face of the workpiece blank, wherein the fine machining tool is either a mandrel honing tool having a cylindrical honing portion, or a one-part tool being at least mandrel-shaped and having a conical portion and a shank portion;
generating a relative feed rate between the fine machining tool and the workpiece blank along the machining axis;
detecting an actual value of a process variable which is a function of a relative force between the fine machining tool and the workpiece blank; and
continuously controlling the process variable, which is a function of a relative torque between the fine machining tool and the workpiece blank, by changing the relative feed rate in such a manner that the more the actual value of the process variable deviates from a nominal value of the process variable, the more the relative feed rate changes, wherein the relative feed rate is at least partially superimposed by a relative oscillating movement which has a frequency in a range from 30 Hz to 100 Hz.

2. The method of claim 1, further comprising:
entering a difference between the nominal value of the process variable and the actual value of the process variable into a controller; and
issuing, by the controller, a correcting variable which actuates a drive motor for generating the feed rate.

3. The method of claim 1, wherein the process variable is additionally a function of an axial relative force between the fine machining tool and the workpiece blank.

4. The method of claim 1, further comprising interrupting an axial feed movement when an axial relative force between the fine machining tool and the workpiece blank exceeds an axial force threshold value and/or when a relative torque between the fine machining tool and the workpiece blank exceeds a torque threshold value.

5. The method of claim 4, further comprising performing a reverse stroke directed counter to the relative feed rate after the interrupting of the axial feed movement.

6. The method of claim 1, further comprising detecting work required for machining the workpiece blank.

7. The method of claim 1, wherein the relative feed rate has an amplitude in a range from 0.5 mm to 4 mm.

8. The method of claim 1, further comprising performing, prior to generating the relative feed rate, a preliminary advance process to detect whether machining of the workpiece blank with the fine machining tool is possible.

9. The method of claim 1, wherein the method further comprises moving the workpiece blank and the fine machining tool relative to one another to a preliminary advance position until at least part of the conical portion of the one-part tool overlaps axially with the cylindrical workpiece face but an annular edge of the cylindrical workpiece face is not contacted by the fine machining tool.

10. The method of claim 9, wherein the relative feed rate is generated upon reaching the preliminary advance position, and the process variable is controlled by changing the relative feed rate.

11. A device for machining the cylindrical workpiece faces, the device comprising:
a clamping installation for the workpiece blank;
the fine machining tool configured to machine the cylindrical workpiece face of the workpiece blank, wherein the fine machining tool is either the mandrel honing tool having the cylindrical honing portion, or the one-part tool being at least mandrel-shaped and having the conical portion and the shank portion;
a rotary drive configured to establish a relative rotation between the workpiece blank and the fine machining tool;
an axial drive configured to establish the relative feed rate between the workpiece blank and the fine machining tool; and
a control device configured to perform the method of claim 1.

12. A method for fine machining a cylindrical workpiece face of a workpiece blank by means of a fine machining tool, said method comprising the following steps:
generating a relative rotation between the fine machining tool and the workpiece blank about a machining axis which is concentric with the cylindrical workpiece face of the workpiece blank, wherein the fine machining tool is a one-part tool being at least mandrel-shaped and having a conical portion and a shank portion;
generating a relative feed rate between the fine machining tool and the workpiece blank along the machining axis;
detecting an actual value of a process variable which is a function of a relative force between the fine machining tool and the workpiece blank;
continuously controlling the process variable, which is a function of a relative torque between the fine machining tool and the workpiece blank, by changing the relative feed rate in such a manner that the more the actual value of the process variable deviates from a nominal value of the process variable, the more the relative feed rate changes;
prior to generating the relative feed rate, moving the workpiece blank and the fine machining tool relative to one another until the conical portion of the one-part tool contacts an annular edge of the workpiece blank; and
detecting an axial relative position between the fine machining tool and the workpiece blank.

* * * * *

UNITED STATES PATENT AND TRADEMARK OFFICE
CERTIFICATE OF CORRECTION

PATENT NO. : 12,070,832 B2  
APPLICATION NO. : 16/647012  
DATED : August 27, 2024  
INVENTOR(S) : Urs Maag, Thomas Kohler and Melchiorre Palumbo Page 1 of 1

It is certified that error appears in the above-identified patent and that said Letters Patent is hereby corrected as shown below:

In the Specification

In the DETAILED DESCRIPTION:

Column 16, Line 5, change "the time tin" to --the time t in--.

Column 16, Line 38, change "time point is a" to --time point $t_5$ a--.

Signed and Sealed this  
Twenty-second Day of October, 2024

Katherine Kelly Vidal  
*Director of the United States Patent and Trademark Office*